United States Patent
Öxle

(10) Patent No.: US 7,612,515 B2
(45) Date of Patent: Nov. 3, 2009

(54) METHOD AND DEVICE FOR IDENTIFYING PINCHING SITUATIONS IN DISPLACING DRIVES IN MOTOR VEHICLES

(75) Inventor: Thomas Öxle, Markdorf (DE)

(73) Assignee: Conti Temic Microelectronic GmbH, Numberg (DE)

( * ) Notice: Subject to any disclaimer, the term of this patent is extended or adjusted under 35 U.S.C. 154(b) by 472 days.

(21) Appl. No.: 11/658,364

(22) PCT Filed: Feb. 17, 2005

(86) PCT No.: PCT/DE2005/000271

§ 371 (c)(1),
(2), (4) Date: Jan. 24, 2007

(87) PCT Pub. No.: WO2006/010349

PCT Pub. Date: Feb. 2, 2006

(65) Prior Publication Data

US 2008/0303460 A1    Dec. 11, 2008

(30) Foreign Application Priority Data

Jul. 24, 2004   (DE) .................. 10 2004 036 116
Dec. 24, 2004   (DE) .................. 10 2004 062 651

(51) Int. Cl.
*G05D 3/00* (2006.01)
(52) U.S. Cl. ................. 318/466; 318/286; 318/369; 318/461; 701/36; 701/49
(58) Field of Classification Search ................. 318/286, 318/369, 461, 466; 701/49, 36
See application file for complete search history.

(56) References Cited

U.S. PATENT DOCUMENTS

| | | | | |
|---|---|---|---|---|
| 5,945,796 | A * | 8/1999 | Ohmori et al. | 318/266 |
| 6,404,158 | B1 * | 6/2002 | Boisvert et al. | 318/469 |
| 6,504,332 | B1 | 1/2003 | Lamm | |
| 6,548,979 | B2 * | 4/2003 | Boisvert et al. | 318/469 |
| 6,573,676 | B1 | 6/2003 | Klesing | |
| 7,548,037 | B2 * | 6/2009 | Boisvert et al. | 318/466 |
| 2002/0101210 | A1 * | 8/2002 | Boisvert et al. | 318/469 |
| 2002/0121872 | A1 * | 9/2002 | Boisvert et al. | 318/469 |
| 2003/0222610 | A1 | 12/2003 | Whinnery | |
| 2004/0183493 | A1 * | 9/2004 | Boisvert et al. | 318/469 |

FOREIGN PATENT DOCUMENTS

| | | |
|---|---|---|
| DE | 40 00 730 | 1/1991 |
| EP | 0 716 492 | 12/1996 |

* cited by examiner

*Primary Examiner*—Rita Leykin

(57) ABSTRACT

Disclosed is a method for identifying pinching situations in a motor-driven displacing device. During a displacing process along an actuating direction, values (W(n) to (W(n−m)) of a quantity (1), which characterizes the currently occurring displacing force, or a quantity derived therefrom are determined and stored, and a quantity (8) that characterizes the pinching force of the displacing device is determined on the basis of at least two stored values (W(n) to (W(n−m)). At least two measured values (W(n) to W(n−m)) of the quantity (1), which characterizes the displacing force, or of a quantity, which is derived from these values (W(n) to W(n−m)), are compared with one another with regard to the time at which they are recorded, and are weighted according to the time at which they are recorded, wherein the quantity (8) that characterizes the pinching force is determined on the basis of the weighted values and is compared with an initiating threshold, and when this initiated threshold is exceeded, the displacing process is stopped and/or the actuation direction is reversed.

19 Claims, 3 Drawing Sheets

METHOD AND DEVICE FOR IDENTIFYING PINCHING SITUATIONS IN DISPLACING DRIVES IN MOTOR VEHICLES

BACKGROUND OF THE INVENTION

The method and the switching arrangement refer to the identification of pinching situations with electrically driven displacing drives in motor vehicles such as for example window lifts, sliding roofs or seat adjustment devices.

For displacing drives of this type there are diverse regulations and guidelines such as 74/60EWG (European Community) of the European Union, EC21 of the United Nations Economic Commission for Europe (UNECE) and FMVSS118 of the American National Highway Traffic Safety Administration. Under certain operational and testing conditions all these regulations demand a limitation of the pinching force to a maximum of 100 Newton. In 74/60/EWG and EC21 elasticity of the described testing body is indicated with 10 N/mm. In FMVSS118 for testing bodies, with a diameter of less than 25 mm, an elasticity of 65 N/mm is indicated and for larger testing bodies it is an elasticity of 20 N/mm. For safe protection of the vehicle passengers with all pinching situations occurring in practice a protection system must be able to identify pinching bodies with very different elastic forces.

For this purpose a number of protection systems is known in prior art.

From EP-A-0 716 492 it is known how to generate a difference from a last measured current value and respective values stored in a first intermediary storage. These differences are stored in a second intermediary storage. These individual differences stored in the second intermediary storage are compared with different references from a fixed value storage. If from now on one of the values from the second intermediary storage is higher than an associated value from the fixed value storage the drive is reversed or stopped.

From US-A-2003/222610 it is known how to determine with an electrically driven motor the speed reduction of the motor and how to further proceed this gained quantity.

In DE 27 27 518 for realizing a pinching protection system it is proposed to determine the clamping force via a defined distance or a defined time and to integrate and/or differentiate these determined values. If the result of these operations exceeds a value stored before, the drive is switched off or the moving direction is reversed.

In supplement DE 27 56 972 to DE 27 27 518 it is proposed to determine the rise of the force from the rise of the motor current.

In DE 30 34 118 a pinching protection system is described, which continuously determines measured values which are dependent on the rotational speed or on the speed of the aggregate or on the control device and compares them with a limiting value referring to the initial measured value and in case of exceeding the limiting value reverses for a short time the displacing direction of the control unit and then switches off the control unit.

From DE 33 03 590 a protection system is known, which determines the course of the performance of the drive motor. The drive motor is stopped or its actuation direction is reversed, if the performance-distance-diagram exceeds an associated performance-tolerance limit.

In DE 35 32 078 it is described for realizing a pinching protection system to determine the changes of the motor current during the closing motion in constant time intervals and to compare these changes to a limiting value. When exceeding the limiting value, it is switched over to the opening motion.

EP 331 659 describes a protection circuit, which determines the motor current in uniform time intervals. The motor is switched off, if the motor current exceeds by a given value an average value formed by several dating back values.

From DE 40 00 730 a method is known, in which one parameter, which refers to the displacing force and the distance covered by the displacing part is determined. Determination is performed of at least one derivation of the parameter according to the distance. The results of the derivation are compared with the limiting values and in case of exceeding the limiting value the drive is switched off or the actuation direction is reversed.

In all aforementioned methods a parameter is determined, which refers to the absolute displacing force or to the rise of the displacing force within a certain time $\Delta t$ or within a certain distance $\Delta s$. If the parameter exceeds a certain threshold value g, the drive is switched off or the moving direction is reversed. In case of a pinching situation, in which the entire elasticity of the drive and of the pinching body is 20 N/mm, within 5 mm a pinching force of 100 N is formed. If the entire elasticity, however, is only 5 N/mm, after 5 mm displacing distance only a force of 25 N has been set up.

The mentioned methods all have the disadvantage that the parameters time $\Delta t$, distance $\Delta s$ and threshold g cannot be adjusted such that with soft as well as with hard pinching bodies the identification of pinching situations is guaranteed and simultaneously sufficient robustness against faulty initiating is given.

In DE 40 00 730 for solving this problem it is proposed to form the derivation of the parameters on the basis of different distance sections and to compare these individual results to different limiting values. The division calculation necessary for calculating the derivation by means of the microcomputers usually used in such systems is time-consuming. In order to meet all the time requirements of the system, it may become necessary when calculating several derivations to use a more powerful and thus more costly microcomputer.

For identifying several pinching scenarios it is proposed in DE 198 40 162 A1 to perform several parallel calculations with different sets of parameters, the sets of parameters of the individual calculations being optimized for certain pinching scenarios.

With the two last mentioned methods the increased calculating expenditure for the additional calculations and the increased storage requirement for the individual sets of parameters is disadvantageous. A further disadvantage is that such a method can be optimized only for a limited number of pinching scenarios.

From DE 199 41 475 a two-step method for adaptation to different spring rates is known, in which the change of the rotational speed is determined and added up. In the first step the added-up change in rotational speed is compared with a threshold and when exceeding this threshold the second step of the method is started. In the second step then the added-up change in rotational speed is compared with a predetermined chronological limiting value course and when exceeding this limiting value the drive is switched off or reversed. Also this method comprises the disadvantage that the threshold in the first step and the predetermined tolerance $\Delta$ in the second step can only be optimally adjusted for one spring rate.

DE 198 40 164 A1 describes a method for adjusting a movable vehicle part between at least two positions, the vehicle part being driven by an electric motor. Here, a pulse signal is produced proportionally to the rotational movement of the electric motor and is supplied to a control unit for controlling the motor, the time of the input of each signal being determined at the control unit, and at certain times a value for the change of the motor rotational speed being determined from at least one part of these times measured so far. From each changing value of the rotational speed a changing value of the force is calculated and at least one part of the changing values of the force determined so far is added-up with a weighting, in order to determine a value for the current force influence onto the movable vehicle part, this value being used as a criteria in the decision whether the motor is switched off or reversed or not. In this connection a force-dependent and threshold-value-based weighting of the changing values of the force is performed such that the weight of a changing value of the force is zero, as far as the value lies below the lower threshold value, whereas the weight for all succeeding values, which exceed this threshold value, is one. In this method the weighting serves for a threshold-value-based selection of individual changing values of the force for the adding-up.

It is the object of the invention to indicate a method, which makes it possible in simple manner to realize a pinching protection system for drive systems in motor vehicles, by means of which soft as well as hard pinching bodies can be detected and with which simultaneously a high reliability is given with regard to faulty initiating.

SUMMARY OF THE INVENTION

This object is achieved by a method for identifying pinching situations in a motor-driven displacing device, wherein during a displacing process along an actuating direction, values (W(n) to (W(n−m)) of the motor current of the motor-driven displacing device or values (1) derived therefrom are determined and stored and from these stored values a quantity (8) that characterizes the pinching force of the displacing device is determined, wherein the motor-driven displacing device is stopped or the actuating direction of the motor-driven displacing device is reversed, if the quantity (8), that characterizes the pinching force, exceeds a predetermined initiated threshold, characterized in that differences are generated from at least two stored values (W(n) to W(n−m)) stored during the displacing process along the actuating direction and in that each of these differences is multiplied by an associated weighting factor k and that the quantity (8), which characterizes the pinching force of the displacing device, is computed by addition to differences multiplied by an associated weighting factor k.

The introduced method is based on considering chronologically dating back and correspondingly weighted current values of a quantity which characterizes the occurring displacing force or of a quantity derived therefrom. This means, in addition to the current measurement, measured values of preceding measurements, depending on their time at which they are recorded or measured and weighted in accordance with their dating back are included into the determination of the quantity which characterizes the pinching force. For this purpose at least two measured values of the quantity characterizing the displacing force or of a quantity derived from these values are compared with each other and are weighted with regard to their time at which they are recorded.

The quantity characterizing the occurring displacing force is preferably determined from the motor current and/or the motor pinching voltage and/or the voltage induced by the motor and/or the rotational speed and/or the displacing speed and/or the anchor resistance and/or the anchor inductance and/or the torque of inertia of the rotor and/or the temperature and/or the motor characteristic curves. These values are preferably detected at uniform temporal distances and/or after certain distance segments covered by the drive.

Beyond this, a change in the displacing force in the form of difference values of measured values of the displacing force is determined as a quantity which characterizes the displacing force. Additionally to determination of the change in the displacing force, which serves for identifying the type and form of the pinching body—soft or hard—, the determined measured values of the displacing force or the determined difference of measured values are weighted time-dependent according to the time at which they are recorded and measured. This allows for a particularly fast and exact identification of a pinching process irrespective of type and form of the pinching body, so that faulty initiatings are safely avoided and reversing of the displacing process can be initiated in particularly fast manner. By a time-dependent weighting of the measured values also ageing-related and/or temperature-depending measuring tolerances can be taken into account.

In a possible form of embodiment the measured values of the quantity which characterizes the displacing force or a quantity derived from these values are weighted such that that value is weighted the weaker, whose time at which it is recorded dates longer back.

For a continuous monitoring of the displacing process the measured values for the displacing force are determined at uniform distances and/or after certain distance segments covered by the drive. Determination of the measured values at temporal distances allows for a safe and robust pinching protection against external interferences. By determining the covered distance dependent on time the displacing process can be additionally monitored in simple and safe manner irrespective of the change in displacing force.

Depending on type and quantity of the displacing process to be monitored, i.e. of a side window in a vehicle door or a roof window, one, two or several differences of measured values or of stored values are generated as a derived quantity. Depending on the type of the method the individual measured value itself and/or the difference from two measured values is processed with an associated time-dependent weighting factor. Here, the quantity which characterizes the pinching force is determined by adding the weighted differences and/or the weighted individual values and their related differences. Thus, the rise of the quantity characterizing the occurring displacing force is evaluated by at least two differences, i.e. while taking into consideration the preceding course.

For monitoring the current displacing process with regard to a safe pinching protection the last stored and/or determined measured values for the displacing force are used for generating the difference. For a monitoring which considers the entire displacing process the current measured value and a measured value which dates longer or measured values which date differently back are used for generating the difference. Preferably, the respective weighting factor for the respective generation of the difference is dependent on the time interval between the last stored value and the directly chronologically preceding value or on a value which dates longer back. In a simple form the measured values are deposited sequentially in a storage according to their time at which they are measured. When using stored values the respective weighting factor is determined on the basis of the distance between the storage positions of the measured values used for generating the difference.

In addition or as an alternative the respective weighting factor and/or the storage position used for generating the difference can be determined depending on the current displacing speed of the displacing device and/or the covered displacing distance. Also an adjustment of a common weighting factor for a region along the displacing distance and for the measured values determined within the region can be effected. For instance, the weighting factor can be smaller with a displacing object positioned in the open end position, e.g. a lowered side window, than with a displacing object positioned in the intermediary position, e.g. a half-open side window. In other words: Between the end positions of the displacing object several distance regions with associated weighting factors can be predetermined. For example, the region of a window lift actuator begins a few millimeters below the top sealing, whereas a low weighting factor is associated to this region. At the upper stop position the region ends, whereas a higher weighting factor is associated to this region. The weighting factor can also increase slowly or continuously or decrease, respectively within a region.

Also further external values, e.g. the vehicle speed, the change of the vehicle electrical system voltage, can be taken into consideration when adjusting the weighting factor.

Examples of embodiment of the present invention will become apparent from the ensuing drawings.

BRIEF DESCRIPTION OF THE DRAWINGS

The drawings show in:

FIG. 2 to

DETAILED DESCRIPTION OF THE DRAWINGS

Figure 1:
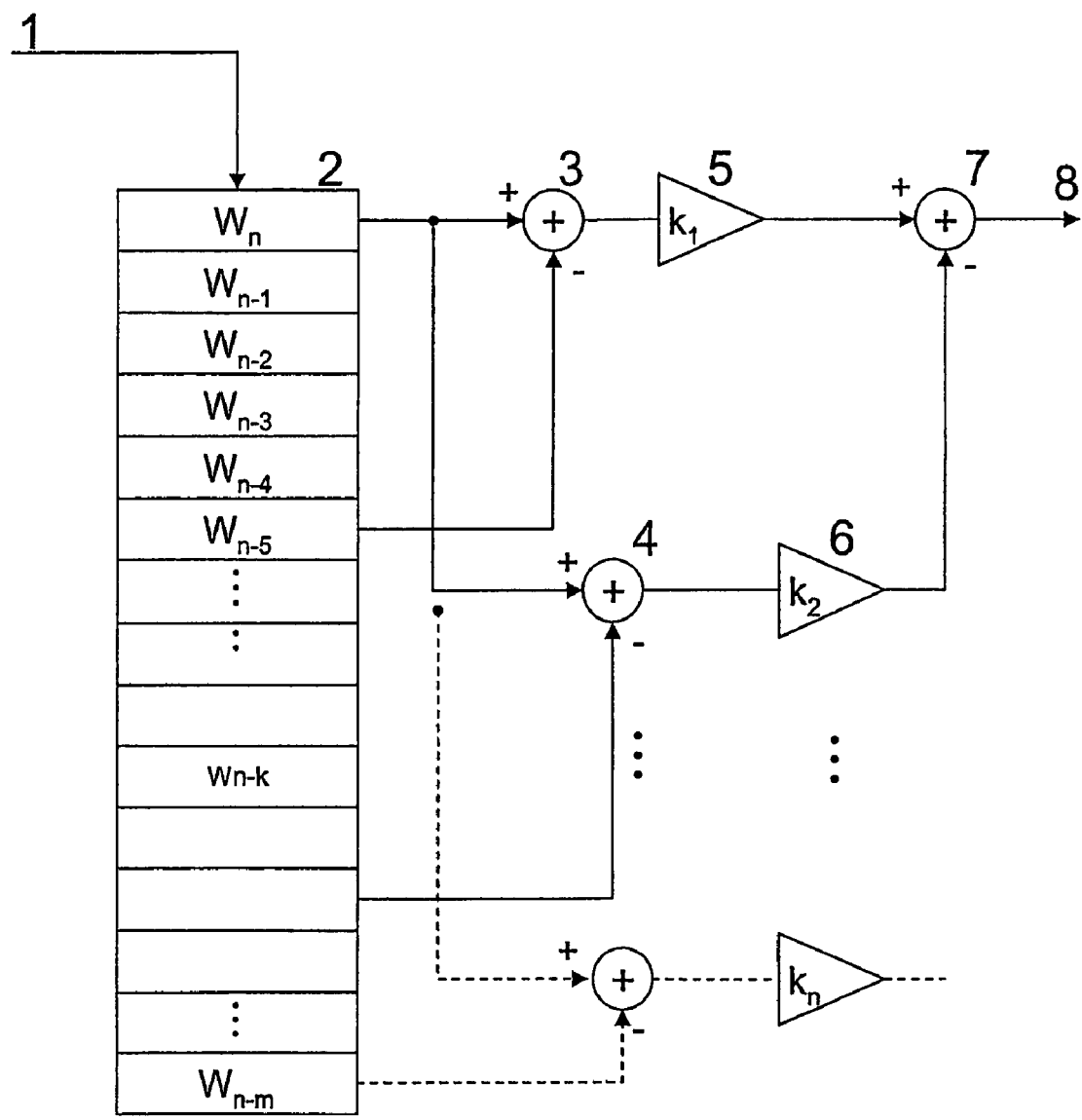
FIG. 1 schematically a block diagram for a method for identifying pinching situations based on weighted current values of a displacing force or a quantity corresponding therewith of a motor-driven displacing device.

In all Figures corresponding parts are provided with equal reference numerals.

Figure 2:
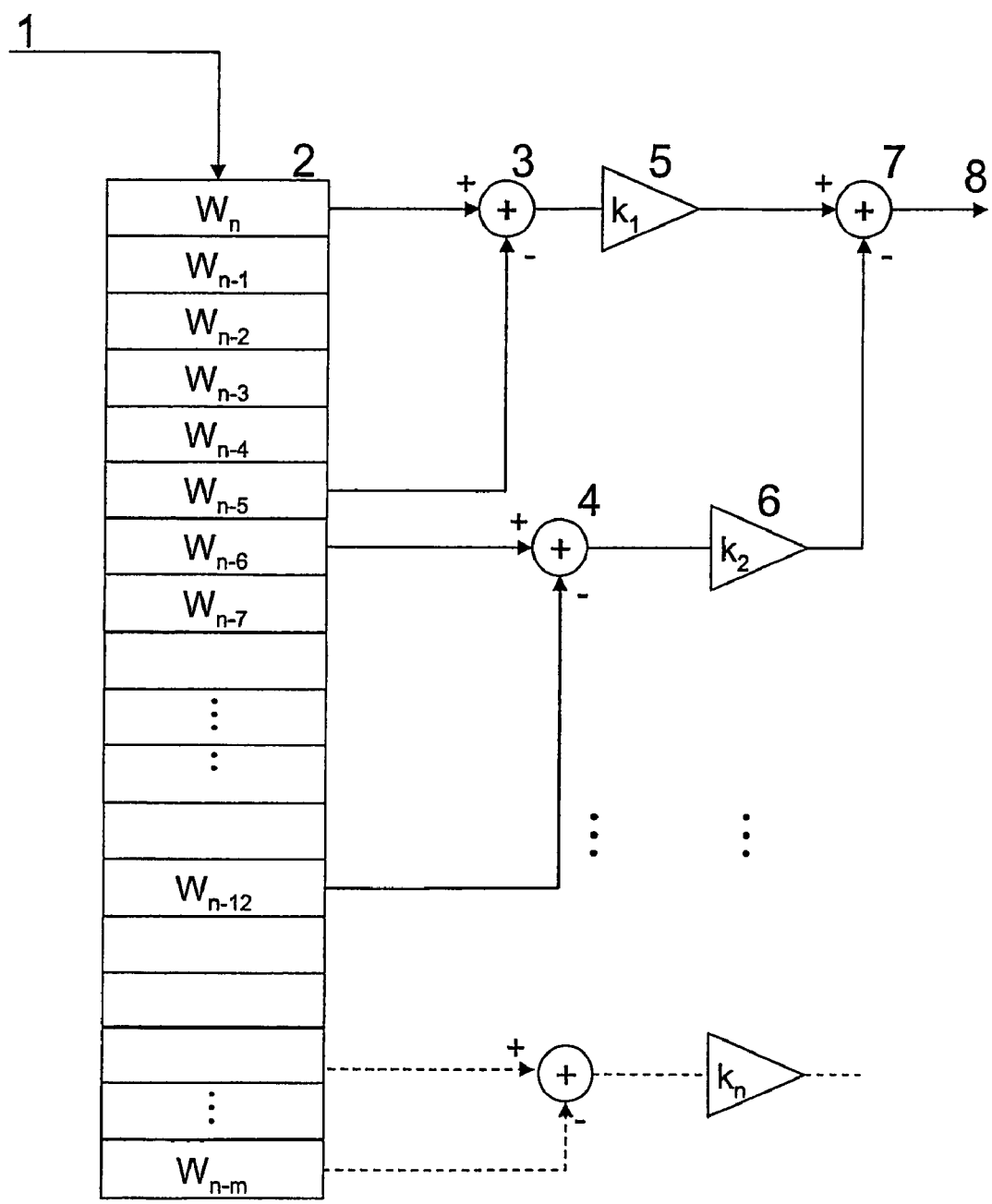
Figure 3:
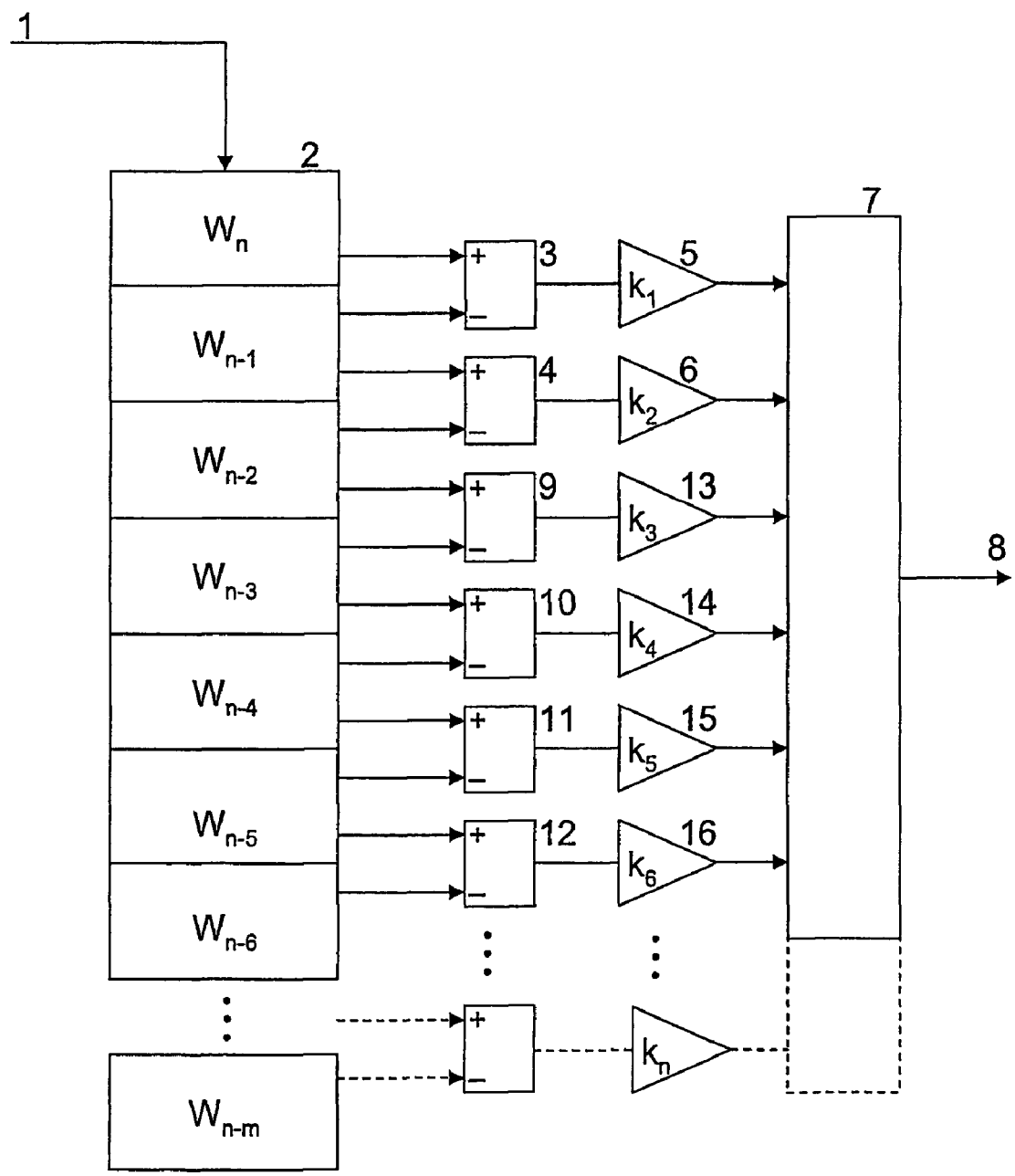
FIG. 3 schematically alternative forms of embodiment of the block diagram according to FIG. 1.

As an example, in FIGS. 1-3 different block diagrams are presented for a method for identifying pinching situations with an electrically driven displacing drive not shown in detail, e.g. a window lift, a sliding roof or a seat displacing device.

With the method according to the invention from a quantity 1 that characterizes the displacing force of a displacing drive the quantity 8 that characterizes the pinching force is determined. The invention is based on the principal idea of an evaluation weighted subject to the time at which the values W(n) to W(n−m) are recorded or measured for the displacing force, of preceding values W(n−m) of a quantity 1 that characterizes the displacing force for determining the quantity 8 that characterizes the pinching force.

A block diagram of a first example of embodiment is indicated in FIG. 1. A quantity 1 that characterizes the displacing force is determined at uniform time intervals and/or after certain distance segments covered by the displacing drive and is stored into storage 2. For example, by means of at least one sensor not shown in detail the motor current, the motor pinching voltage, the voltage induced by the motor, the rotational speed, the displacing speed, the anchor resistance, the anchor inductance, the torque of inertia of the rotor, the motor temperature and/or the motor characteristic curves of the displacing device is determined as measured values or as values W(n) to W(n−m) of a quantity 1 which characterizes the current displacing force. With each storage process the determined measured values (in short called values W(n) to W(n−m)) are pushed one storage address or storage block further down in the shown storage 2 and the currently determined value W(n) of the quantity 1 that characterizes the displacing force is stored in the storage block into the top storage block.

In another realisation of the method according to the invention the storage 2 can also be embodied as a so-called ring storage, in which the values W(n) to W(n−m) are successively stored in a storage and when the limit of the storage is reached, it is restarted at the storage beginning. Addressing of preceding values W(n−m) is then effected always relatively to the current storage address.

For determining the change of the displacing force effected during the displacing process in a next step the difference between the current value W(n) of the quantity 1 that characterizes the displacing force and a preceding value W(n−m) of the quantity 1, for example the determined value W(n−5) of the quantity 1 at an earlier time, is determined by means of a summary member in block 3. This difference is multiplied in block 5 by a weighting factor $k_1$. The weighting factor $k_1$ is determined here on the basis of the time interval between the time at which the current value W(n) is recorded and the time at which the preceding value W(n−5) is recorded.

In block 4 a further difference between the currently determined value W(n) of the quantity 1 that characterizes the displacing force and the determined value W(n−m) is determined at an earlier time. This difference is then multiplied in block 6 by an associated weighting factor $k_2$, which according to the invention based on the higher time interval of the further difference is smaller than the weighting factor $k_1$.

The quantity 8 that characterizes the pinching force is then generated in block 7 by adding the two differences of block 5 and block 6.

In FIG. 2 a second example of embodiment is indicated, which is very similar to the first example of embodiment. The difference is that for generating the second difference not the current value W(n) and a preceding value W(n−m) of the quantity 1 that characterizes the displacing force is used, but two values W(n−k), W(n−m) which date differently back are used, e.g. of the value pair W(n) and W(n−5) and of the value pair W(n−6) and W(n−12). Such taking into consideration of values dating differently back and of their differences enables monitoring by region of the displacing process. For example, the beginning region or the end region is monitored for generating the difference when closing a window with different time intervals between the values W(n−k) and W(n−m), the end region of the displacing process being monitored with a clearly smaller time interval of the values W(n−k) and W(n−m) than the beginning region. In the less critical beginning region with a still large opening of the window this allows for a processing of the measured values while saving storage and work capacity and in the critical end region with a very small opening of the window and a high risk of pinching an object this allows for a fast and save identification of a possible pinching. The respective difference with a small or large time interval of the basic values W(n−k) and W(n−m) is furthermore processed with an associated time-depending weighting factor $k_1$ or $k_2$, respectively, a higher weighting being associated to the difference with the shorter time interval than to the difference with the higher time interval.

In FIG. 3 a third example of embodiment is indicated, in which the quantity 1 that characterizes the displacing force is again stored in the storage 2 as in the first example of embodiment. In the blocks 3, 4, 9, 10, 11 and 12 the difference respectively between the two successive values is determined and the respective difference in the blocks 5, 6, 13, 14, 15 and 16 is multiplied by an associated, time-dependent weighting factor $k_1$, $k_2$, $k_3$, $k_4$, $k_5$, $k_6$ to $k_n$. In other words: For a permanent and realtime monitoring of the displacing process preferably values W(n−k), W(n−m) of directly succeeding values W(n) and W(n−1) or W(n−1) and W(n−2) or W(n−2) and W(n−3), etc. are used as value pairs. Then, in block 7 the quantity 8 that characterizes the pinching force is generated by adding all individual results.

In this case, in a preferred form of embodiment the weighting factors $k_1$ to $k_n$ with the small indices $k_1$, $k_2$ are chosen to be higher than the large indices $k_5$, $k_6$.

In a further example of embodiment the difference between the currently determined value W(n) and the quantity 1 that characterizes the displacing force and the afore determined value W(n−1) of the quantity 1 that characterizes the displacing force is supplied to a non-recursive digital system with the transfer function $$H(z) = \sum_{\mu=0}^{M} b_\mu \cdot z^{-\mu}. \quad [1]$$

The output signal of the system is determined each after recording of a new input value. In doing so, the factors $b_\mu$ are higher adjusted for small values of $\mu$ than for high values of $\mu$. The output of the digital system corresponds to the quantity 8 that characterizes the pinching force, which subsequently is compared to a initiating threshold, the drive being switched off or reversed when exceeding this threshold.

A further advantage of the method can be seen in that only addition, subtraction and multiplication operations are required. These operations can be computed very fast by the microcomputers usually used in such displacing drives.

In a developing embodiment of the method according to the invention the weighting factors $k_1$ to $k_n$ and/or the storage positions used for generating the difference are adjusted subject to the displacing speed. Advantageously, here the weighting factors $k_1$ to $k_n$, associated to the rises which do not date back so far, are adjusted higher in case of higher displacing speeds than in case of lower displacing speeds.

When determining the quantity 1 that characterizes the displacing force at uniform time intervals it is advantageous with faster displacing speeds to chose the distance of the storage positions used for generating the difference to be smaller than with lower displacing speeds, as with faster displacing speeds the pinching force establishes faster than with slower displacing speeds.

In a developing embodiment of the method according to the invention the weighting factors $k_1$ to $k_n$ and/or the storage positions used for generating the difference are adjusted subject to the current displacing position. Preferably, in the displacing regions, in which rough-running has been detected in preceding operations, the weighting factors $k_1$ to $k_n$ for the weighting factors associated to the rises dating farther back are decreased and/or the storage positions, which do not date back so far, are used for generating the difference. The advantage of this embodiment is that faulty initiatings of the pinching protection system due to rough-runnings are prevented, while at the same time identification, in particular of harder pinching bodies, is not affected.

A further embodiment of the method according to the invention provides that the weighting factors $k_1$ to $k_n$ and/or the storage positions used for generating the difference in the region of the intake of the window into the upper sealing is changed such that by means of the increased frictional forces shortly before and during the sealing intake no faulty initiating of the pinching protection system occurs. Advantageously, here the weighting factors $k_1$ to $k_n$ associated to the rises dating farther back are decreased and/or the storage positions, which do not date back so far, are used for generating the difference.

In a further form of embodiment it is provided that the weighting factors $k_1$ to $k_n$ and/or the storage positions used for generating the difference in the region 25 mm before the upper sealing are chosen to be different than in the remaining region to make allowance for the different elastic forces of the pinching bodies with different diameters in the regulation FMVSS 118.

A further embodiment provides that after the start of the displacing drive for a certain time and/or for a certain distance segment the weighting factors $k_1$ to $k_n$ and/or the storage positions used for generating the difference are changed such that faulty initiatings of the pinching protection system are prevented due to the transient response of the drive and in doing so, at the same time pinching situations are safely identified. Advantageously, here the weighting factors $k_1$ to $k_n$ associated to the rises dating farther back are decreased and/or the storage positions, which do not date back so far, are used for generating the difference.

A further advantage of the method is that also under disturbed operating conditions adjustment of the time intervals and/or storage positions for generating the difference and/or further parameters, in particular operational parameters of the vehicle, is effected such that pinching situations are identified and the disturbances do not cause faulty initiatings of the pinching protection system.

Thus, in a special embodiment of the method it is established whether and at which speed the vehicle moves and the weighting factors $k_1$ to $k_n$ are adapted such that the changes in the quantity 1 that characterizes the displacing force, which are caused by accelerating forces acting onto the vehicle body when driving a bumpy street, are not interpreted as increase of the quantity 8 that characterizes the pinching force. For this purpose, e.g. from a certain speed the weighting factors $k_1$ to $k_n$ associated to the increases dating farther back are decreased and/or the storage positions not dating back so far are used for generating the difference.

A further embodiment provides in case of changes of the vehicle electrical system voltage to decrease the weighting factors $k_n$ associated to the rises dating farther back and/or to use the storage positions not dating back so far for generating the difference to prevent that the change, caused by the change of the vehicle electrical system voltage, of the quantity 1 that characterizes the displacing force is not interpreted as changes of the quantity 8 that characterizes the pinching force.

| List of Reference numerals | |
| --- | --- |
| 1 | a quantity that characterizes the displacing force |
| 2 | Storage |
| 3 to 4 | blocks for generating the difference |
| 5 to 6 | blocks for weighting |
| 8 | a quantity that characterizes the pinching force |
| 9 to 12 | blocks for generating the difference |
| 13 to 16 | blocks for weighting |
| $k_1$ to $k_n$ | weighting factor |
| W(n) to W(n−m) | measured values of a quantity that characterizes the displacing force |

The invention claimed is:

1. A method for identifying pinching situations in a motor-driven displacing device, the method comprising:

determining, during a displacing process along an actuating direction, values (W(n) to (W(n−m)) of a motor current of the motor-driven displacing device;

storing the values;

determining, from the stored values, a quantity (8) that characterises a pinching force of the displacing device, wherein the motor-driven displacing device is stopped or the actuating direction of the motor-driven displacing device is reversed, if the quantity (8), that characterises the pinching force, exceeds a predetermined initiated threshold; and generating differences from at least two stored values (W(n) to W(n−m)) stored during the displacing process along the actuating direction; wherein each of the differences is multiplied by an associated weighting factor k and that the quantity (8), which characterises the pinching force of the displacing device, is computed by addition to differences multiplied by an associated weighting factor k.

2. A method according to claim 1, wherein the measured values (W(n)−(W(n−in)) of the quantity (8) which characterises the displacing force or of a quantity, which is derived from these measured values (W(n)−W(n−m)) are weighted with regard to the time at which they are recorded such that that value (W(n)−W(n−m)) is weighted the weaker, whose time at which it is recorded dates longer back.

3. A method according to claim 1, wherein the value (1) that characterizes the currently occurring displacing force is determined from at least one of a motor pinching voltage, a voltage induced by the motor, a rotational speed, a displacing speed, an anchor resistance, an anchor inductance, a torque of inertia of the rotor, a temperature, and motor characteristic curves.

4. A method according to claim 1, wherein the values (W(n) to (W(n−m)) are determined at uniform time distances or after certain distance segments covered by the drive.

5. A method according to claim 4, wherein one or more differences of stored values (W(n) to (W(n−m)) are generated as a derived quantity, subsequently for weighting each of these differences is multiplied by an associated weighting factor (k1 to kn).

6. A method according to claim 5, wherein one of the values (W(n) to (W(n−m)) used for generating the difference corresponds to the last stored value (W(n)).

7. A method according to claim 5, wherein as the values (W(n) to (W(n−m)) used for generating the difference values (W(n) to (W(n−m)) are used which date differently back.

8. A method according to claim 5, wherein directly succeeding stored values (W(n) to (W(n−m)) are used for generating at least one of the differences.

9. A method according to claim 8, wherein a respective weighting factor (kn) is dependent on the distance between the storage position of the last stored value and the storage position of the first value used for generating the difference.

10. A method according to claim 8, wherein a respective weighting factor ($k_n$) is dependent on the distance between the storage position of the last stored value and the storage position of at least one value disposed chronologically before the last stored value.

11. A method according to claim 8, wherein a respective weighting factor ($k_n$) is dependent on the distance of the concerned storage positions of the values used for generating the concerned difference.

12. A method according to claim 5, wherein at least one of the respective weighting factors (kn) and the storage positions used for generating the difference are fixed subject to the current displacing speed of the displacing device.

13. A method according to claim 5, wherein at least one of the respective weighting factors ($k_n$) and the storage positions used for generating the difference are fixed subject to the current displacing position or to a quantity (1) that characterizes the displacing force and that has been determined at this displacing position during prior displacing processes or to a quantity (8) that characterizes the pinching force and that has been determined at this displacing position during prior displacing processes or to the time period after a last displacing process.

14. A method according to claim 5, wherein a displacing distance is subdivided into several regions and at least one of the weighting factors (kn) and the storage positions used for generating the difference are adjusted differently in individual regions

15. A method according to claim 5, wherein a top region of a window lift displacing drive begins some millimeters below the upper sealing and ends at the upper stop position.

16. A method according to claim 5, wherein after the start of the displacing process at least one of the weighting factors (kn) and the storage positions used for generating the difference are adjusted differently from the remaining operation for a predeterminable time or for a certain distance covered by the drive.

17. A method according to claim 5, wherein at least one of the weighting factors (kn) and the storage positions used for generating the difference are adjusted subject to the vehicle speed.

18. A method according to claim 5, wherein at least one of the weighting factors (kn) and the storage positions used for generating the difference are adjusted subject to a change of the vehicle electrical system voltage.

19. A method according to claim 1, wherein a motor drive, wherein during a displacing process along an actuating direction, values (W(n) to (W(n−m)) of a quantity (1), which characterizes the displacing force currently occurring at the time at which it is recorded, or of a quantity corresponding therewith can be determined and stored, and a quantity (8) that characterizes the pinching force of the displacing device can be determined on the basis of at least two stored values (W(n) to (W(n−in)), wherein the values (W(n) to W(n−m)) which are used to determine the quantity (8) that characterizes the pinching force or quantities derived from these values (W(n) to W(n−m)) are compared and weighted with one another with regard to the time at which they are recorded, wherein the quantity (8) that characterizes the pinching force is determined on the basis of the weighted values and is compared with an initiating threshold, and when this initiated threshold is exceeded, the displacing process is stopped and/or the actuation direction is reversed.

* * * * *